US007324783B2

(12) United States Patent
Anderson

(10) Patent No.: US 7,324,783 B2
(45) Date of Patent: Jan. 29, 2008

(54) METHOD, ARRANGEMENT AND COMMUNICATION RECEIVER FOR SNIR ESTIMATION

(75) Inventor: Nicholas Anderson, Bath (GB)

(73) Assignee: IPWireless, Inc., San Bruno, CA (US)

( * ) Notice: Subject to any disclaimer, the term of this patent is extended or adjusted under 35 U.S.C. 154(b) by 103 days.

(21) Appl. No.: 10/303,304

(22) Filed: Nov. 25, 2002

(65) Prior Publication Data
US 2005/0207476 A1 Sep. 22, 2005

(30) Foreign Application Priority Data
Nov. 28, 2001 (GB) ................................. 0128475.1

(51) Int. Cl.
*H04B 1/00* (2006.01)
*H04B 15/00* (2006.01)
(52) U.S. Cl. ................ 455/63.1; 455/67.13; 455/114.2; 455/226.3; 375/227; 375/340; 375/342
(58) Field of Classification Search ............. 455/226.2, 455/226.3, 63.1, 67.11, 67.13, 114.2; 375/227, 375/340, 342, 346
See application file for complete search history.

(56) References Cited

U.S. PATENT DOCUMENTS

| 5,347,228 A | * | 9/1994 | Iwasaki | ...................... 329/308 |
| 5,602,962 A | * | 2/1997 | Kellermann | ................ 704/226 |
| 5,737,365 A | | 4/1998 | Gilbert et al. | |

(Continued)

FOREIGN PATENT DOCUMENTS

WO  WO-9940689  8/1999

(Continued)

OTHER PUBLICATIONS

Boche, H, et al. (2000). "Capacity Improvement of CDMA-based Mobile Communication Systems using Linear Antenna Arrays—Theoretical and Experimental Results," Proceedings of the 43rd IEEE Midwest Symposium on Circuits and Systems, Lansing, MI, USA, 2:540-543.

(Continued)

*Primary Examiner*—Matthew Anderson
*Assistant Examiner*—Tuan Pham
(74) *Attorney, Agent, or Firm*—Morrison & Foerster LLP

(57) ABSTRACT

A method, arrangement (512) and communication receiver (500) for SNIR estimation of a received signal, by: deriving (512A) an estimation $\hat{Z}$ of SNIR of the received signal in accordance with the relation $$\hat{Z} = \frac{[E\{|r(t)|\}]^2}{E\{r^2(t)\} - [E\{|r(t)|\}]^2},$$

where E represents mean value and r(t) represents the level of the received signal; and correcting (512B, 512C) the estimation $\hat{Z}$ to produce a corrected estimation Z based on the relation $Z = \alpha(\hat{Z}) \times \hat{Z}$, where $\alpha(\hat{Z})$ represents a correction factor. The estimation may be corrected by calculating the correction factor, retrieving the correction factor from a predetermined table (512B) or retrieving the corrected estimation from a predetermined table. The correction may be effected by adding to a logarithmic estimation a logarithmic correction factor. This provides the advantage of improved performance under conditions of low signal to noise ratio.

33 Claims, 6 Drawing Sheets

U.S. PATENT DOCUMENTS

| | | | |
|---|---|---|---|
| 5,774,837 A * | 6/1998 | Yeldener et al. | 704/208 |
| 6,028,864 A | 2/2000 | Marttinen et al. | |
| 6,061,339 A * | 5/2000 | Nieczyporowicz et al. | 370/335 |
| 6,256,338 B1 * | 7/2001 | Jalloul et al. | 375/142 |
| 6,292,519 B1 * | 9/2001 | Popovic | 375/346 |
| 6,611,794 B1 * | 8/2003 | Fleming-Dahl | 702/191 |
| 2003/0046713 A1 * | 3/2003 | Bontempi | 725/151 |
| 2005/0027520 A1 * | 2/2005 | Mattila et al. | 704/228 |

FOREIGN PATENT DOCUMENTS

| | | |
|---|---|---|
| WO | WO-9946869 | 9/1999 |
| WO | WO-0182521 | 3/2001 |
| WO | WO-0120789 | 11/2001 |
| WO | WO-0182538 | 11/2001 |
| WO | WO-0225853 | 3/2002 |

OTHER PUBLICATIONS

International Search Report mailed on Feb. 27, 2003, for PCT Application No. PCT/GB02/05399, filed on Nov. 22, 2002, three pages.

Search Report dated Sep. 4, 2002, for GB Application No. GB 0128475.1, one page.

Search Report dated Nov. 15, 2006, for EP Application No. 02804284.4, four pages.

* cited by examiner

METHOD, ARRANGEMENT AND COMMUNICATION RECEIVER FOR SNIR ESTIMATION

FIELD OF THE INVENTION

This invention relates to signal to noise/interference ratio (SNIR) estimation, and particularly though not exclusively to such estimation in wireless communication receivers.

BACKGROUND OF THE INVENTION

Many parts of a wireless communications receiver often require an estimation of signal to interference ratio (SIR), signal to-noise ratio (SNR), or (more generically to include SIR and/or SNR) noise plus interference ratio (SNIR). This is needed for purposes of power control, threshold determination for various algorithms, quantisation of soft-decision information for channel decoding purposes to name but a few.

A well-known SNIR estimation technique derives its estimated SNIR $\hat{Z}$ as $$\hat{Z} = \frac{[E\{|r(t)|\}]^2}{E\{r^2(t)\} - [E\{|r(t)|\}]^2}$$

where E represents mean value and r(t) represents the combination of signal s(t) and noise n(t).

However, this known estimator suffers from a bias term under conditions of low signal to noise ratio.

A need therefore exists for SNIR estimation wherein the abovementioned disadvantages may be alleviated.

STATEMENT OF INVENTION

In accordance with a first aspect of the present invention there is provided a method for SNIR estimation of a received signal, the method comprising:

deriving an estimation signal $\hat{Z}$ of SNIR of the received signal in accordance substantially with the relation $$\hat{Z} = \frac{[E\{|r(t)|\}]^2}{E\{r^2(t)\} - [E\{|r(t)|\}]^2},$$

where E represents mean value and r(t) represents the level of the received signal; and correcting the estimation signal $\hat{Z}$ to produce a corrected estimation signal Z based on substantially the relation $$Z = \alpha(\hat{Z}) \times \hat{Z},$$

where $\alpha(\hat{Z})$ represents a correction factor.

In accordance with a second aspect of the present invention there is provided an arrangement for SNIR estimation of a received signal, the arrangement comprising:

means for deriving an estimation $\hat{Z}$ of SNIR of the received signal in accordance substantially with the relation $$\hat{Z} = \frac{[E\{|r(t)|\}]^2}{E\{r^2(t)\} - [E\{|r(t)|\}]^2},$$

where E represents mean value and r(t) represents the level of the received signal; and means for correcting the estimation $\hat{Z}$ to produce a corrected estimation Z based on substantially the relation $$Z = \alpha(\hat{Z}) \times \hat{Z},$$

where $\alpha(\hat{Z})$ represents a correction factor.

The arrangement of the invention's second aspect may be comprised in a communication receiver such as in user equipment or a base station for use in a wireless communication system.

BRIEF DESCRIPTION OF THE DRAWINGS

One method, arrangement and communications receiver for SNIR estimation incorporating the present invention will now be described, by way of example only, with reference to the accompanying drawings, in which.

DESCRIPTION OF PREFERRED EMBODIMENT

A well-known estimator detects the SNIR of a symmetric binary-valued signal (for example, Binary Phase Shift Keyed—BPSK), under noise of zero mean. The method is also applicable to QPSK (Quadrature Phase Shift Keyed) signals.

The method considers a BPSK signal s(t), which may assume the value +/− A. Additive white Gaussian noise (AWGN), denoted n(t), is added to this signal. n(t) has a Gaussian probability density function (PDF) and has a variance (power) of $\sigma^2$. The composite signal plus noise is denoted as:

$$r(t) = s(t) + n(t).$$

The PDF of r(t) takes the form:

$$P\{r(t) = y\} = \frac{1}{\sqrt{2\pi\sigma^2}} \frac{1}{2}\left\{e^{\frac{-(y+A)^2}{2\sigma^2}} + e^{\frac{-(y-A)^2}{2\sigma^2}}\right\}.$$

Figure 1:
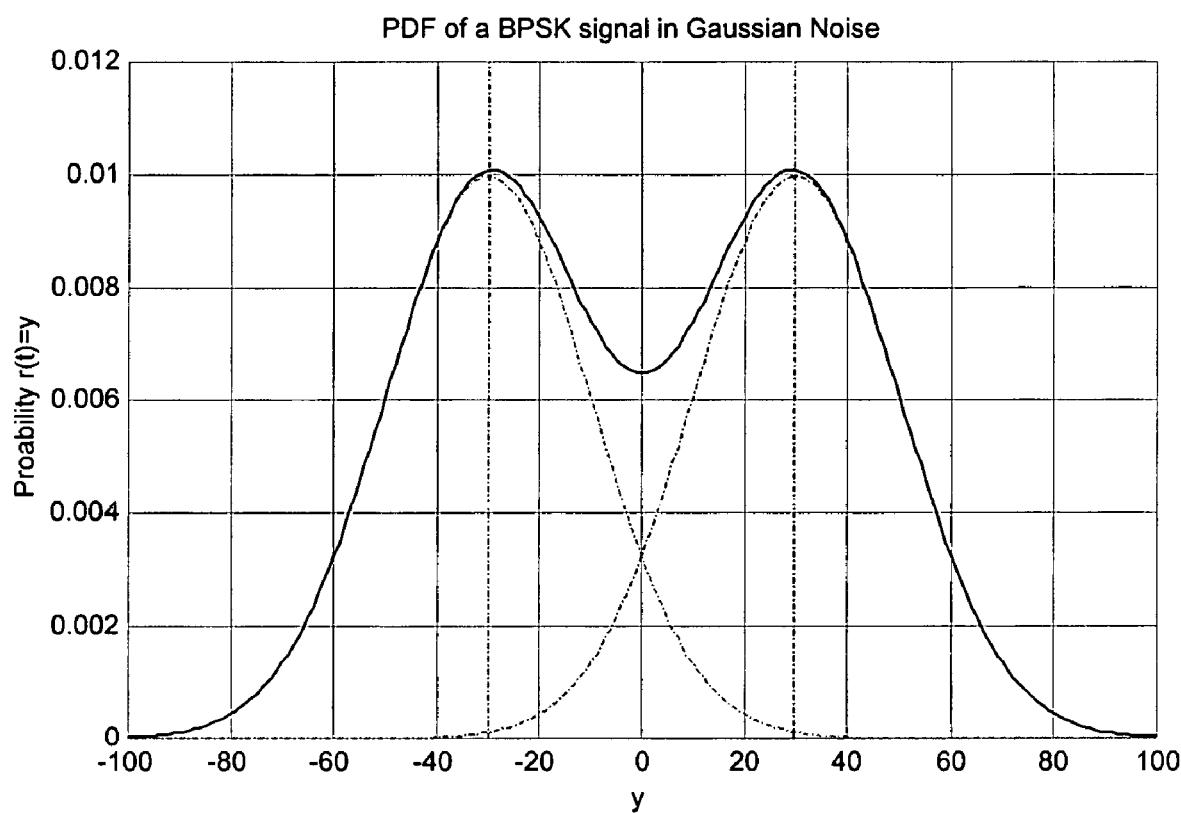
FIG. 1 shows a graphical representation of the probability density function (PDF) of a received binary-valued signal plus noise.

This PDF is shown in FIG. 1. This corresponds to the case of A=30 and $\sigma^2$=400.

The SNIR estimation technique uses the following estimator (Ŝ) for the signal power S:

$$S = E\{s^2(t)\} \text{ and } \hat{S} \cong [E\{|r(t)|\}]^2.$$

The estimate (T̂) of the total power (T) of r(t) is:

$$\hat{T} = E\{r^2(t)\}.$$

And so, since r(t)=s(t)+n(t), the noise power N must be equal to the total power minus the signal power:

$$N = T - S.$$

And so the estimate (N̂) of the noise power N is given by:

$$\hat{N} = \hat{T} - \hat{S} = E\{r^2(t)\} - [E\{|r(t)|\}]^2.$$

Thus, the signal to noise ratio estimate is:

$$\hat{Z} = \frac{\hat{S}}{\hat{N}} = \frac{\hat{S}}{\hat{T} - \hat{S}} = \frac{[E\{|r(t)|\}]^2}{E\{r^2(t)\} - [E\{|r(t)|\}]^2}.$$

Figure 2:
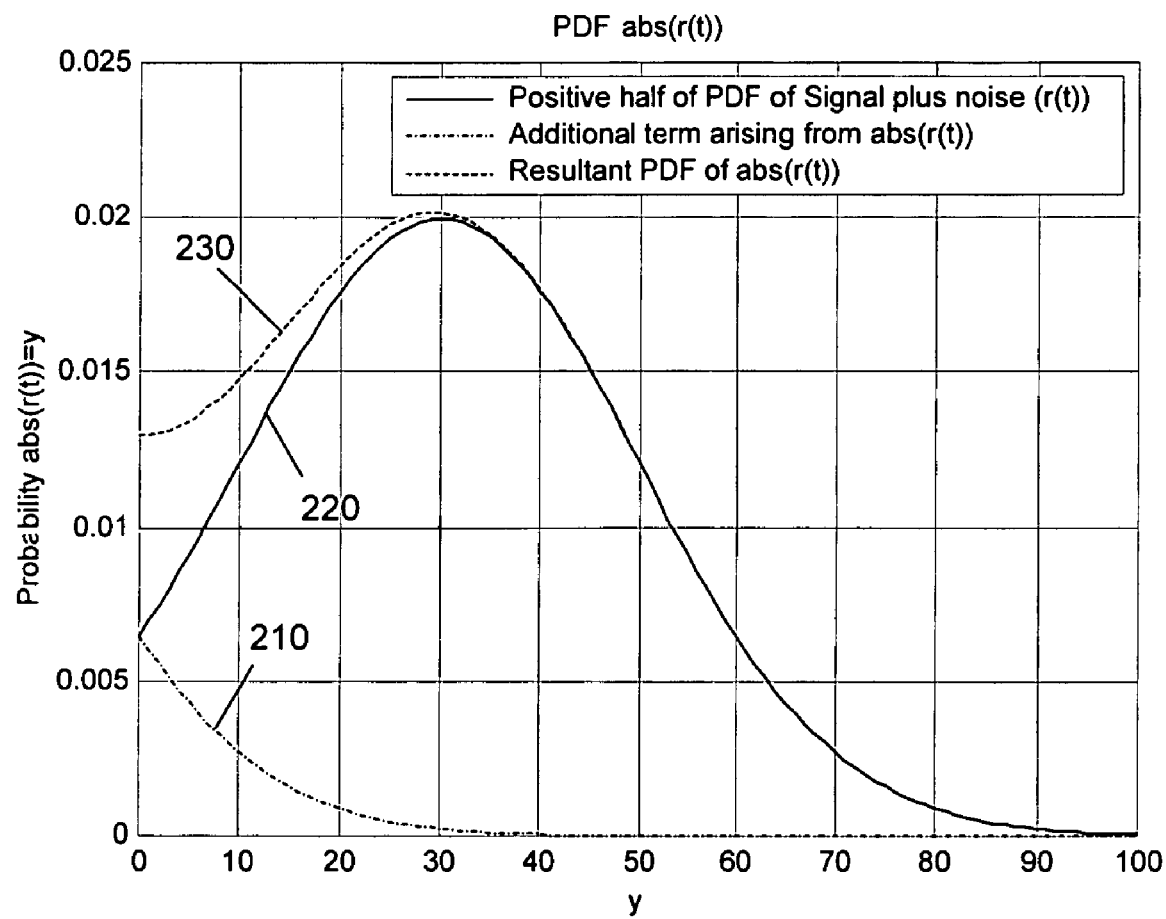
FIG. 2 shows a graphical representation of the positive half of the PDF of FIG. 1, illustrating distortion of the signal power estimate $\hat{S}$ at low signal to noise ratios.

The present invention invention is based upon the realisation by the inventor that the above technique suffers from a bias term for low signal to noise ratio. Due to the use of the "absolute-value" operator, the estimate of the signal amplitude (Â) becomes distorted due to the overlap that occurs between the positive and negative portions of the PDF of r(t). Hence the signal power estimate (Ŝ) is also distorted. This is shown in FIG. 2 for a single signalling state (+1) of amplitude A and power S=A²:

Portions of the PDF of r(t) that cross the line r(t)=0 (as shown by the line portions 210 and 220) are sign-reversed before being accumulated (as shown by the line 230) and averaged, and so the estimate of the mean value of r(t) is distorted. In effect, as the signal to noise ratio decreases, so the signal power estimate becomes more over-estimated. The estimate of the total power (T̂) is however, unaffected. The effect on the overall SNIR estimate is the result of Ŝ appearing in both the numerator and denominator of the equation used to calculate Ẑ.

This bias offset however, can be shown to be a direct function of the real signal to noise ratio (Z). Thus, if the relationship between Ẑ and Z is derived and known a priori, then the bias may be removed from Ẑ and the true SNIR (Z) may be recovered. Such correction is the basis of the present invention.

The mean value of a signal x(t) is defined as:

$$E\{x(t)\} = \int_{-\infty}^{\infty} y \cdot P\{x(t) = y\} dy$$

where P{x(t)=y} is the probability of x(t) assuming the value y.

By substituting |r(t)| for x(t) in the above equation, and by integrating only between 0 and ∞ owing to the fact that |r(t)| is positive-valued only, we are able to derive the mean value of |r(t)|. In this case, the probability P{|r(t)|=y} is given by:

$$P\{|r(t)| = y\}_{y=0 \to \infty} = \frac{1}{\sqrt{2\pi\sigma^2}} \left[ e^{\frac{-(y-A)^2}{2\sigma^2}} + e^{\frac{-(y+A)^2}{2\sigma^2}} \right]$$

and so the mean value of |r(t)| is written as:

$$\hat{A} = E\{|r(t)|\} = \int_0^\infty y \cdot \frac{1}{\sqrt{2\pi\sigma^2}} \left[ e^{\frac{-(y-A)^2}{2\sigma^2}} + e^{\frac{-(y+A)^2}{2\sigma^2}} \right] dy$$

Evaluating the above integral, the signal amplitude estimate (Â) can be shown to be:

$$\hat{A} = A \left[ 1 + \sqrt{\frac{2}{\pi Z}} e^{-\frac{Z}{2}} - \text{erfc}\left(\sqrt{\frac{Z}{2}}\right) \right]$$

where erfc represents the Complementary Error function and $$Z = \frac{A^2}{\sigma^2}.$$

Using this last relationship and the fact that $$\hat{Z} = \frac{\hat{A}^2}{A^2 + \sigma^2 - \hat{A}^2},$$

the required relationship between Ẑ and Z can be derived as:

$$\hat{Z} = \frac{\left[ 1 + \sqrt{\frac{2}{\pi Z}} e^{-\frac{Z}{2}} - \text{erfc}\left(\sqrt{\frac{Z}{2}}\right) \right]^2}{1 + \frac{1}{Z} - \left[ 1 + \sqrt{\frac{2}{\pi Z}} e^{-\frac{Z}{2}} - \text{erfc}\left(\sqrt{\frac{Z}{2}}\right) \right]^2}.$$

Figure 3A:
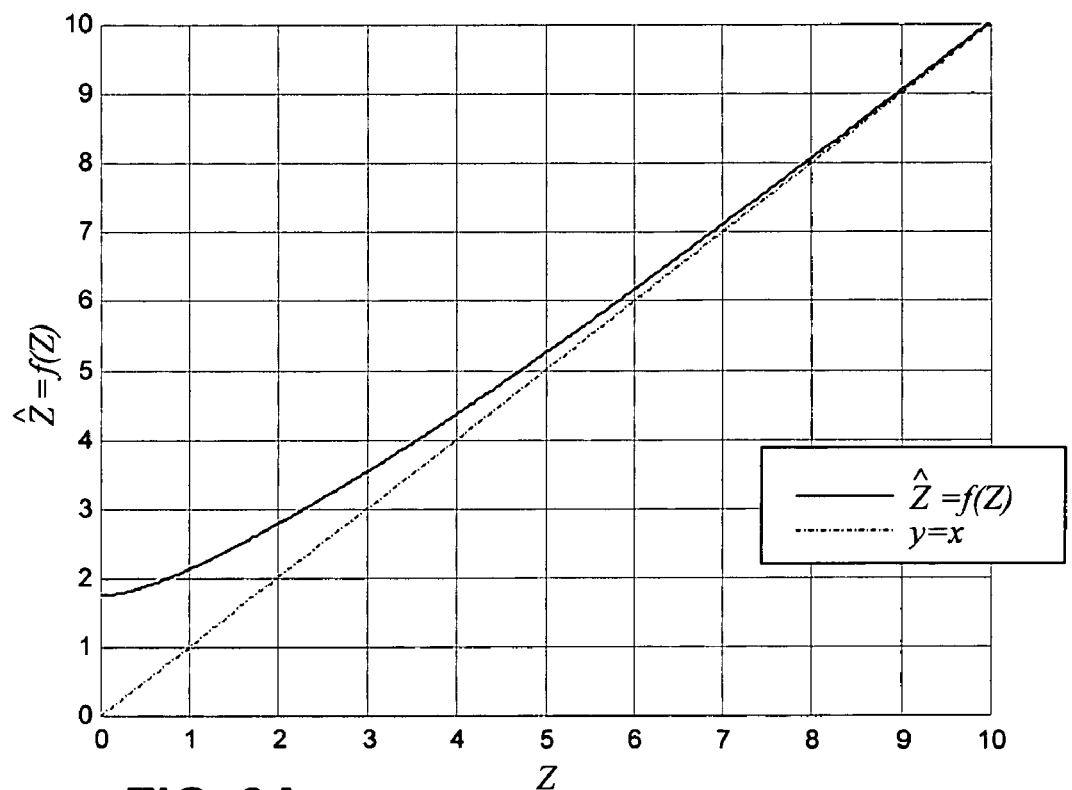
FIG. 3A shows a graphical representation illustrating the relationship of estimated SNIR $\hat{Z}$ to real SNIR Z.

Z is plotted against Ẑ in the graph of FIG. 3A.

Figure 3B:
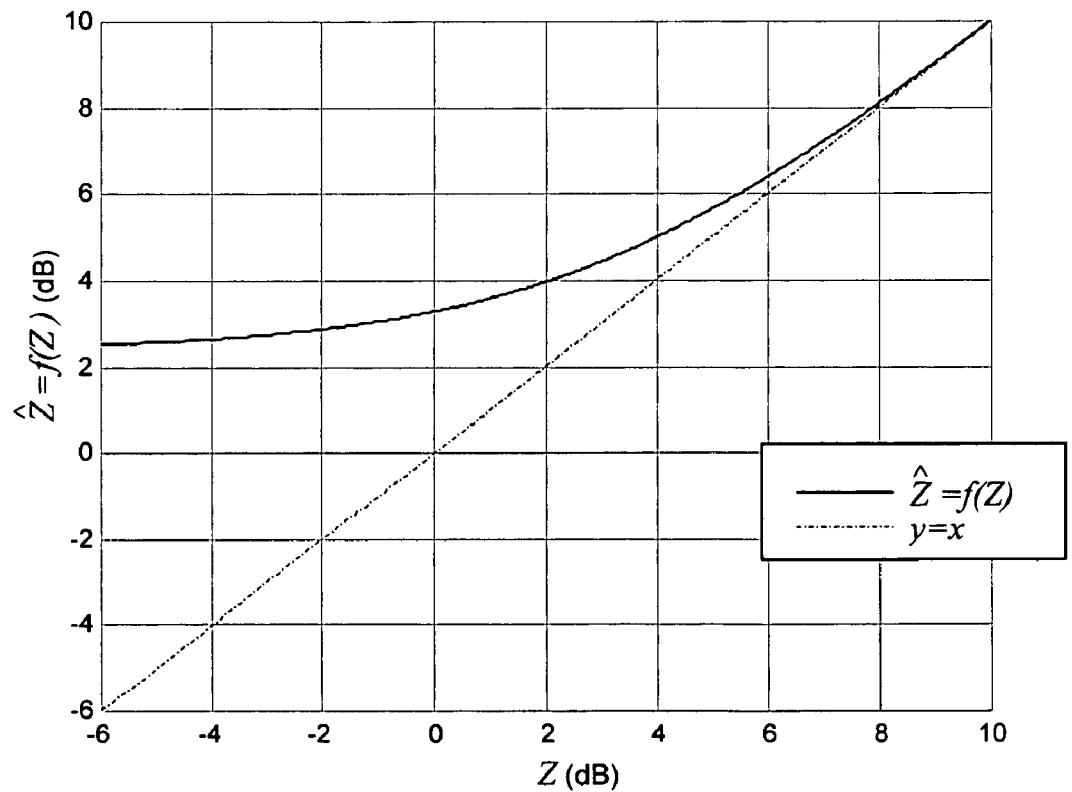
FIG. 3B shows, similarly to FIG. 3A, a logarithmic (decibel) graphical representation illustrating the relationship of estimated SNIR $\hat{Z}$ to real SNIR Z.

If the SNIR estimate is expressed in decibels, as is often the case, the graph of FIG. 3A becomes that shown in FIG. 3B.

As can be seen, the error in decibels between the estimated SNIR, and the true SNIR becomes appreciable for real SNIR's of less than approximately 8 dB. This therefore limits the usefulness of this SNIR technique, unless the measurement is corrected. By removing the bias in keeping with this invention (as will be explained more fully below), the usefulness of this SNIR estimation technique can be extended to lower SNIR's.

Figure 4A:
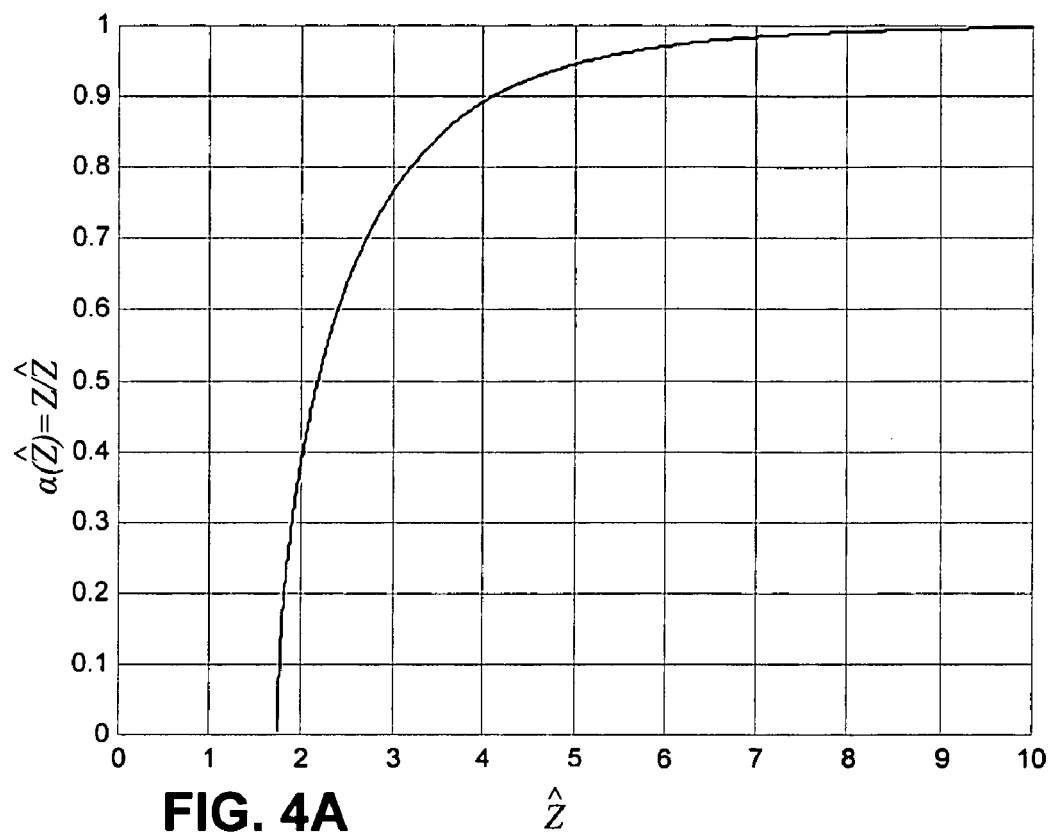
FIG. 4A shows a graphical representation illustrating the relationship of a correction factor $\alpha(\hat{Z})$ to the uncorrected estimated SNIR $\hat{Z}$.

To remove the bias, we assume that Z can be determined from:

$$Z = \alpha(\hat{Z}) \times \hat{Z}$$

where $\alpha(\hat{Z})$ is a correction factor as a function of the uncorrected SNIR estimate Ẑ and may be determined by plotting Ẑ against (Z/Ẑ) as shown in FIG. 4A.

$\alpha(\hat{Z})$ may therefore be either (i) calculated from Ẑ or may be (ii) stored in tabulated form for 'look-up' in order to facilitate the evaluation of the true SNIR Z. Alternatively, it will be understood, (iii) a table may hold corrected values of Z and the uncorrected estimated value Ẑ may serve as a pointer to the table to 'look-up' the corrected value. It will be understood that all three such correction techniques are different implementations of the same underlying correction scheme based on the corrected SNIR estimate Z being a predefined function (as described above) of the uncorrected SNIR estimate $\hat{Z}$.

Figure 4B:
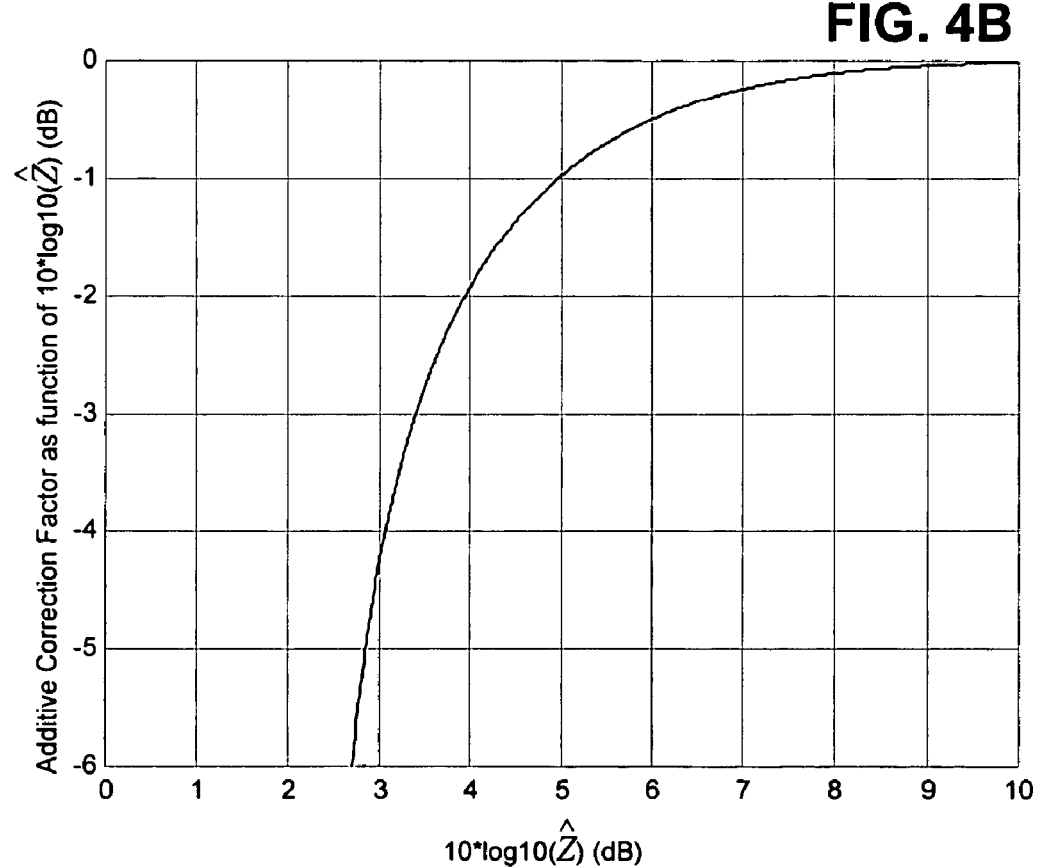
FIG. 4B shows, similarly to FIG. 4A, a logarithmic (decibel) graphical representation illustrating the relationship of the correction factor $\alpha(\hat{Z})$ to the uncorrected estimated SNIR $\hat{Z}$.

In terms of a logarithmic correction factor $\Gamma\{10.\log_{10}(\hat{Z})\}$ to be added to $10.\log_{10}(\hat{Z})$ in order to derive $10.\log_{10}\{Z\}$, the relationship shown in FIG. 4B may be inferred, such that:

$$10.\log_{10}(Z) = 10.\log_{10}(\hat{Z}) + \Gamma(10.\log_{10}(\hat{Z})).$$

It is recognised that as the SNIR is reduced towards zero, so $\hat{Z}$ tends asymptotically towards approximately 1.75. At these low SNIR's, small variations in $\hat{Z}$ produce large variations in Z. As such, this technique has limitations at very low SNIR's since a highly accurate measurement of $\hat{Z}$ is required. This would require a large number of samples to be used in the computation of $\hat{Z}$ which may not be available in practical circumstances. However, this technique is able to significantly reduce the bias effects of the prior art SNIR estimation technique for the SNIR range between approximately 0 and 8 dB.

Figure 5:
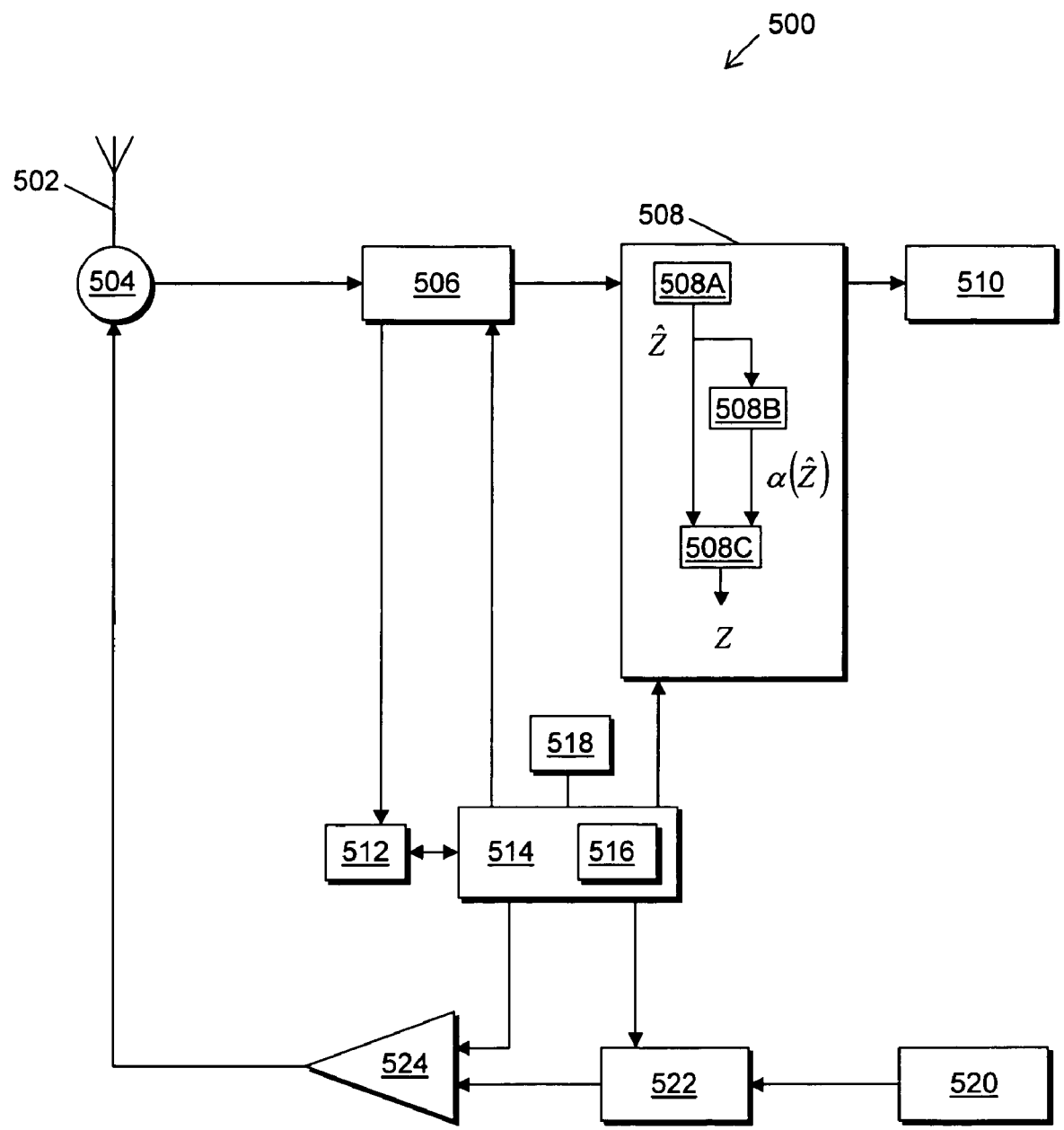
FIG. 5 shows a block-schematic diagram of a wireless communication system receiver in which the invention is used.

The corrected estimation technique described above may be used in a receiver in wireless communication system such as UTRA TDD (UMTS—Universal Mobile Telecommunication System—Terrestrial Radio Access in Time Division Duplex mode). Such a receiver, which may be a mobile transceiver unit (commonly referred to in UMTS terminology as User Equipment—UE) or a base station transceiver unit (commonly referred to in UMTS terminology as a Node B) is shown in block schematic form in FIG. 5. The transceiver unit 500 contains an antenna 502 coupled to a duplex filter or circulator 504 that provides isolation between receive and transmit chains within the transceiver unit.

The receiver chain, as known in the art, includes scanning receiver front-end circuitry 506 (effectively providing reception, filtering and intermediate or base-band frequency conversion). The scanning front-end circuit is serially coupled to a signal processing function 508, in which the invention may be implemented as will be described in greater detail below.

An output from the signal processing function is provided to output 510, which comprises either: an interface for communicating with a radio network controller if the communication unit is a Node B, or an interface for communicating with (for example) a user display if the communication unit is a UE.

The receiver chain also includes a received signal strength indicator (RSSI) module 512 and a controller 514 that operates to a maintain overall control of the different functions and modules of the communication unit 500. The controller 514 is also coupled to the scanning receiver front-end circuitry 506 and the signal processing function 508 (generally realised by a digital signal processor, i.e. DSP).

The controller 514 includes a memory 516 that stores operating regimes, such as decoding and other receiving operations. A timer 518 is typically coupled to the controller 514 to control the timing of operations (transmission or reception of time-dependent signals) within the communication unit 500.

As regards the transmit chain, this includes an input 520, which comprises either: an interface for communicating with a radio network controller if the communication unit is a Node B, or an interface for receiving user input if the communication unit is a UE. The input 520 is coupled in series through transmitter/modulation circuitry 522 and a power amplifier 524 to the antenna 502. The transmitter/modulation circuitry 522 and the power amplifier 524 are operationally responsive to the controller.

It will be understood that in this embodiment the controller 514 including memory 516 is implemented as a programmable processor, but in other embodiments can comprise dedicated circuitry or any other suitable form.

It is noted that corresponding features to those described above with respect to the communication unit 500 are also found in conventional Node B's. However, the communication unit 500 of this embodiment differs over conventional communication units by virtue that the signal processing function 508 is arranged to implement the corrected estimation technique described above.

The signal processing function 508 includes circuitry (not shown) for quantisation of soft-decision information for channel decoding purposes (e.g., using a Viterbi decoder—not shown—to decode symbols in a received signal). Accurate estimation of the SNIR of the received signal improves the accuracy of the soft-decision in respect of decoded symbols, and also enhances the error-correcting ability of the channel decoder. In order to implement the corrected estimation technique described above, the signal processing function 508 includes circuitry 508A for deriving the received signal's uncorrected SNIR $\hat{Z}$, as known in the prior art described above. Additionally, a table 508B for looking up the correction factor $\alpha(\hat{Z})$ (as explained above in relation to FIGS. 4A and 4B) is included. The signal processing function 508 also includes a processor 508C for applying the correction factor to the uncorrected SNIR $\hat{Z}$ to produce the corrected SNIR Z, as described above.

It will be understood that in practice the look-up table 508B may be provided within the memory 516 in the controller 514, and that the processor 508C may be provided by the controller 514). It will also be understood that if it is not desired to implement correction of the estimated SNIR by way of a look-up table 512B, the correction factor $\alpha(\hat{Z})$ may be calculated (e.g., by the controller 514) in accordance with the above-discussed equation:

$$\hat{Z} = \frac{\left[1 + \sqrt{\frac{2}{\pi Z}} e^{-\frac{z}{2}} - \text{erfc}\left(\sqrt{\frac{Z}{2}}\right)\right]^2}{1 + \frac{1}{Z} - \left[1 + \sqrt{\frac{2}{\pi Z}} e^{-\frac{z}{2}} - \text{erfc}\left(\sqrt{\frac{Z}{2}}\right)\right]^2}$$

Although in the above example the corrected estimation technique of the invention is implemented for purposes of quantisation of soft-decision information for channel decoding purposes, it may alternatively or additionally be implemented for purposes of power control, threshold determination for various algorithms, etc., and may be implemented at the output of a correlator, a joint detector, or other detector.

Figure 6:
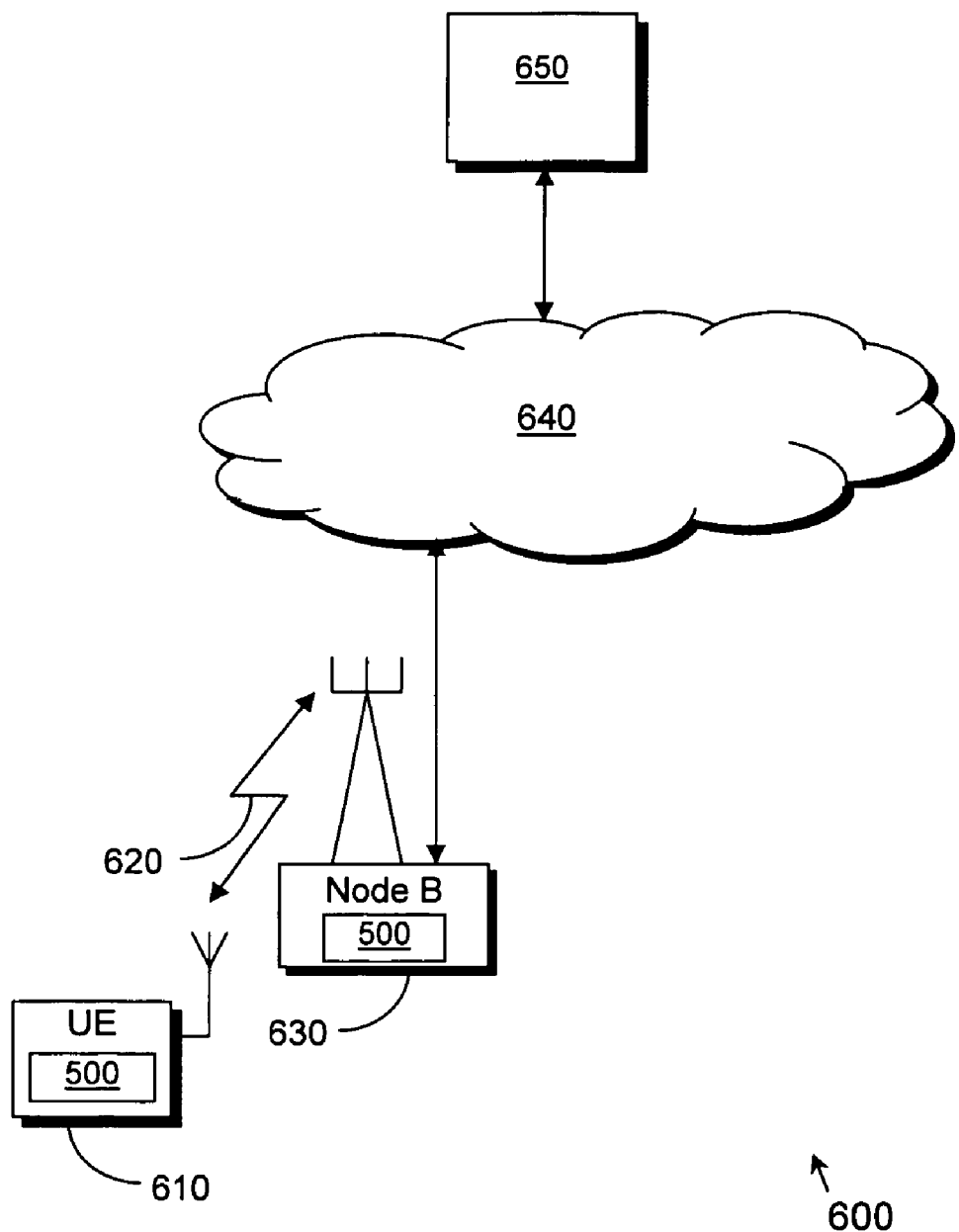
FIG. 6 shows a block-schematic diagram of a UTRA TDD system in which the invention is used.

Referring now also to FIG. 6, a UTRA TDD system 600 includes a UE 610 which communicates over a CDMA radio air interface 620 with a Node B 630. The Node B 630 is controlled by a radio network controller 640, which communicates with other system infrastructure shown collectively as 650. Such a system (insofar as it has been described up to this point) is well known and need not be described further. However, it will be understood that the communication unit 500 described above for deriving a corrected SNIR estimation may be advantageously implemented in either a UE 610 or a Node B 630 of the system as shown in the figure.

It will be appreciated that the method described above for SNIR estimation of a received signal may be carried out in software running on a processor (such as the processor in which the controller 514 and the memory 516 is implemented), and that the software may be provided as a computer program element carried on any suitable data carrier (also not shown) such as a magnetic or optical computer disc.

It will be also be appreciated that the method described above for SNIR estimation of a received signal may alternatively be carried out in hardware, for example in the form of an integrated circuit (not shown) such as an FPGA (Field Programmable Gate Array) or ASIC (Application Specific Integrated Integrated Circuit).

In conclusion, therefore, it will be understood that the scheme for SNIR estimation described above provides the following advantages:

Enables non-biased direct SNIR estimation on a single or binary-valued signal in the presence of additive white Gaussian noise.

Extends the useful range of the method detailed in prior-art into the medium-low SNIR range 0-8 dB, in which the technique detailed in the prior art would suffer significant measurement bias.

What is claimed is:

1. A method for estimating an accurate signal quality metric of a received signal, the method comprising:
   receiving a signal;
   calculating an estimated signal quality metric $\hat{Z}$ of the received signal, wherein the estimated signal quality metric $\hat{Z}$ is based on $$\hat{Z} = \frac{[E\{|r(t)|\}]^2}{E\{r^2(t)\} - [E\{|r(t)|\}]^2},$$

wherein E is mean value and r(t) is the level of the received signal, $[E\{|r(t)|\}]^2$ is the estimated signal power, and $E\{r^2(t)\}-[E\{|r(t)|\}]^2$ is a difference of the estimated total power and the estimated signal power;
   determining a correction factor based on a received signal variance and an estimated amplitude; and
   applying the correction factor to the estimated signal quality metric to determine a corrected signal quality metric.

2. The method of claim 1 wherein the signal quality metric is a logarithmic quantity and the step of correcting the estimated signal quality metric comprises adding a logarithmic correction factor to the estimated signal quality metric $\hat{Z}$ to produce a corrected signal quality metric Z.

3. The method of claim 1 wherein the step of correcting the estimated signal quality metric comprises retrieving the correction factor from a predetermined table.

4. The method of claim 1 wherein the step of correcting the corrected signal quality metric from a predetermined table.

5. The method of claim 1 wherein the received signal is a wireless signal.

6. The method of claim 5 wherein the wireless signal is a Universal Mobile Telecommunication System (UMTS) air interface signal.

7. A computer-readable medium encoded with computer program instructions for performing the method of claim 1.

8. The method of claim 1, wherein applying the correction factor comprises multiplying the estimated signal quality metric by the correction factor.

9. The method of claim 1, wherein determining the correction factor is further based on a measured amplitude of the received signal.

10. The method of claim 1, wherein determining the correction factor is based on $Z=\alpha(\hat{Z})\times\hat{Z}$, wherein α is the correction factor, $\hat{Z}$ is the estimated signal quality metric, $\hat{A}$ is the estimated signal amplitude, Z is the corrected signal quality metric, A is signal amplitude, and $\sigma_2$ is the variance, and
wherein $$\hat{Z} = \frac{\hat{A}^2}{A^2 + \sigma^2 - \hat{A}^2}, Z = \frac{A^2}{\sigma^2}, \text{ and } \hat{A} = A\left[1 + \sqrt{\frac{2}{\pi Z}}\, e^{-Z/2} - \text{erfc}\left(\sqrt{\frac{Z}{2}}\right)\right].$$

11. The method of claim 10 wherein $Z=\alpha(\hat{Z})\times\hat{Z}$ is based on $$\hat{Z} = \frac{\left[1 + \sqrt{\frac{2}{\pi Z}}\, e^{-\frac{Z}{2}} - \text{erfc}\left(\sqrt{\frac{Z}{2}}\right)\right]^2}{1 + \frac{1}{Z} - \left[1 + \sqrt{\frac{2}{\pi Z}}\, e^{-\frac{Z}{2}} - \text{erfc}\left(\sqrt{\frac{Z}{2}}\right)\right]^2}.$$

12. The method of claim 1, wherein the received signal is a symmetric binary-valued signal.

13. The received signal of claim 12, wherein the symmetric binary-valued signal is a Binary Phase Shift Keyed signal (BPSK).

14. The method of claim 1, wherein the received signal is a Quadrature Phase Shift Keyed signal (QPSK).

15. The method of claim 1, wherein the signal quality metric is a Signal to Noise-plus-Interference Ratio (SNIR).

16. An apparatus for estimating an accurate signal quality metric estimation of a received signal, the apparatus comprising:
   control logic for determining a correction factor for an estimated signal quality metric of a received signal, wherein the correction factor is based on the received signal variance and an estimated amplitude; and
   signal processing logic for determining an estimated signal quality metric $\hat{Z}$ of the received signal and applying the correction factor to the estimated signal quality metric to provide a corrected signal quality metric, wherein the signal quality metric $\hat{Z}$ is based on $$\hat{Z} = \frac{[E\{|r(t)|\}]^2}{E\{r^2(t)\} - [E\{|r(t)|\}]^2},$$

wherein E is mean value and r(t) is the level of the received signal, $[E\{|r(t)|\}]^2$ is the estimated signal power, and $E\{r^2(t)\}-[E\{|r(t)|\}]^2$ is a difference of the estimated total power and the estimated signal power.

17. The apparatus of claim 16 wherein the estimated signal quality metric is a logarithmic quantity and the signal processing logic for correcting the estimated signal quality metric comprises logic for adding a logarithmic correction factor to the estimated signal quality metric $\hat{Z}$ to produce a corrected signal quality metric Z.

18. The apparatus of claim 16 wherein the means for correcting the estimated signal quality metric comprises means for retrieving the correction factor from a predetermined table.

19. The apparatus of claim 16 wherein the means for correcting the estimated signal quality metric comprises means for retrieving the corrected signal quality metric from a predetermined table.

20. The apparatus of claim 16 wherein the received signal is a wireless signal.

21. The apparatus of claim 20 wherein the wireless signal is a Universal Mobile Telecommunication System (UMTS) air interface signal.

22. A communication receiver comprising the apparatus of claim 16.

23. User equipment for use in a wireless communication system, the user equipment comprising the communication receiver of claim 22.

24. A base station for use in a wireless communication system, the base station comprising the communication receiver of claim 22.

25. An integrated circuit comprising the apparatus of claim 16.

26. The apparatus of claim 16, wherein the signal processing logic is operable to multiply the estimated signal quality metric by the correction factor.

27. The apparatus of claim 16, wherein the control logic is operable to determine a measured amplitude of the received signal.

28. The apparatus of claim 16, wherein the correction factor is based on $$Z=\alpha(\hat{Z})\times\hat{Z},$$

wherein $\alpha$ represents the correction factor, $\hat{Z}$ is the estimated signal quality metric; $\hat{A}$ is the estimated signal amplitude, Z is the corrected signal quality metric, A is signal amplitude, and $\sigma^2$ is the variance, and wherein $$\hat{Z} = \frac{\hat{A}^2}{A^2 + \sigma^2 - \hat{A}^2}, Z = \frac{A^2}{\sigma^2}, \text{ and } \hat{A} = A\left[1 + \sqrt{\frac{2}{\pi Z}}\, e^{-Z/2} - \text{erfc}\left(\sqrt{\frac{Z}{2}}\right)\right].$$

29. The apparatus of claim 28 wherein the relationship $$Z=\alpha(\hat{Z})\times\hat{Z}$$

is based on $$\hat{Z} = \frac{\left[1 + \sqrt{\frac{2}{\pi Z}}\, e^{-\frac{z}{2}} - \text{erfc}\left(\sqrt{\frac{Z}{2}}\right)\right]^2}{1 + \frac{1}{Z} - \left[1 + \sqrt{\frac{2}{\pi Z}}\, e^{-\frac{z}{2}} - \text{erfc}\left(\sqrt{\frac{Z}{2}}\right)\right]^2}.$$

30. The apparatus of claim 16, wherein the received signal is a symmetric binary-valued signal.

31. The received signal of claim 30, wherein the symmetric binary-valued signal is a Binary Phase Shift Keyed signal (BPSK).

32. The received signal of claim 16, wherein the received signal is a Quadrature Phase Shift Keyed signal (QPSK).

33. The apparatus of claim 16, wherein the signal quality metric is a Signal to Noise-plus-Interference Ratio (SNIR).

* * * * *